L. W. DOWNES.
MULTIPLE UNIT CHUCK.
APPLICATION FILED JULY 31, 1911.
1,036,977.
Patented Aug. 27, 1912.
2 SHEETS—SHEET 2.
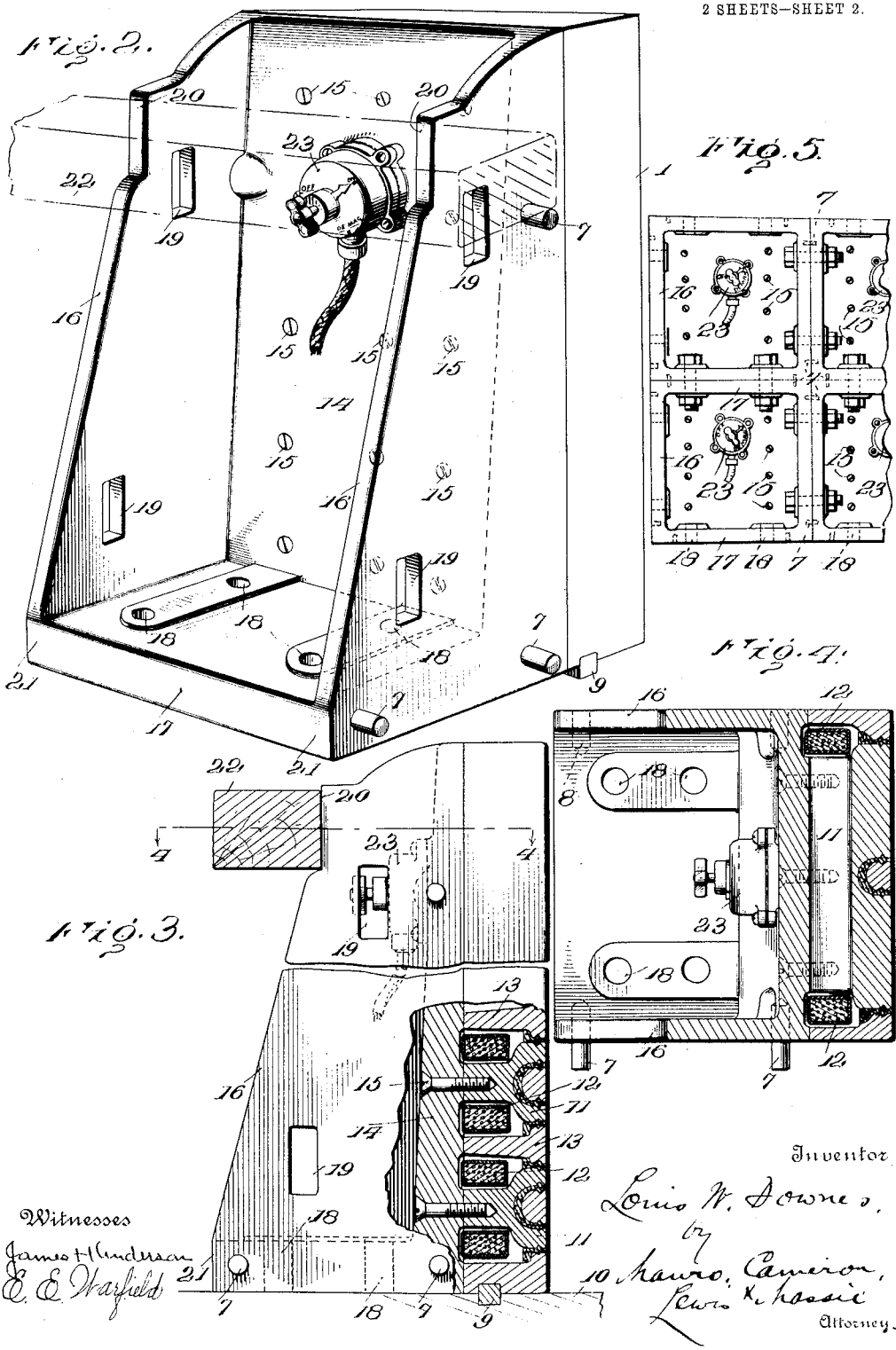
Witnesses
James H Anderson
E. E. Warfield
Inventor
Louis W. Downes,
by
Mauro, Cameron,
Lewis & Massie
Attorneys

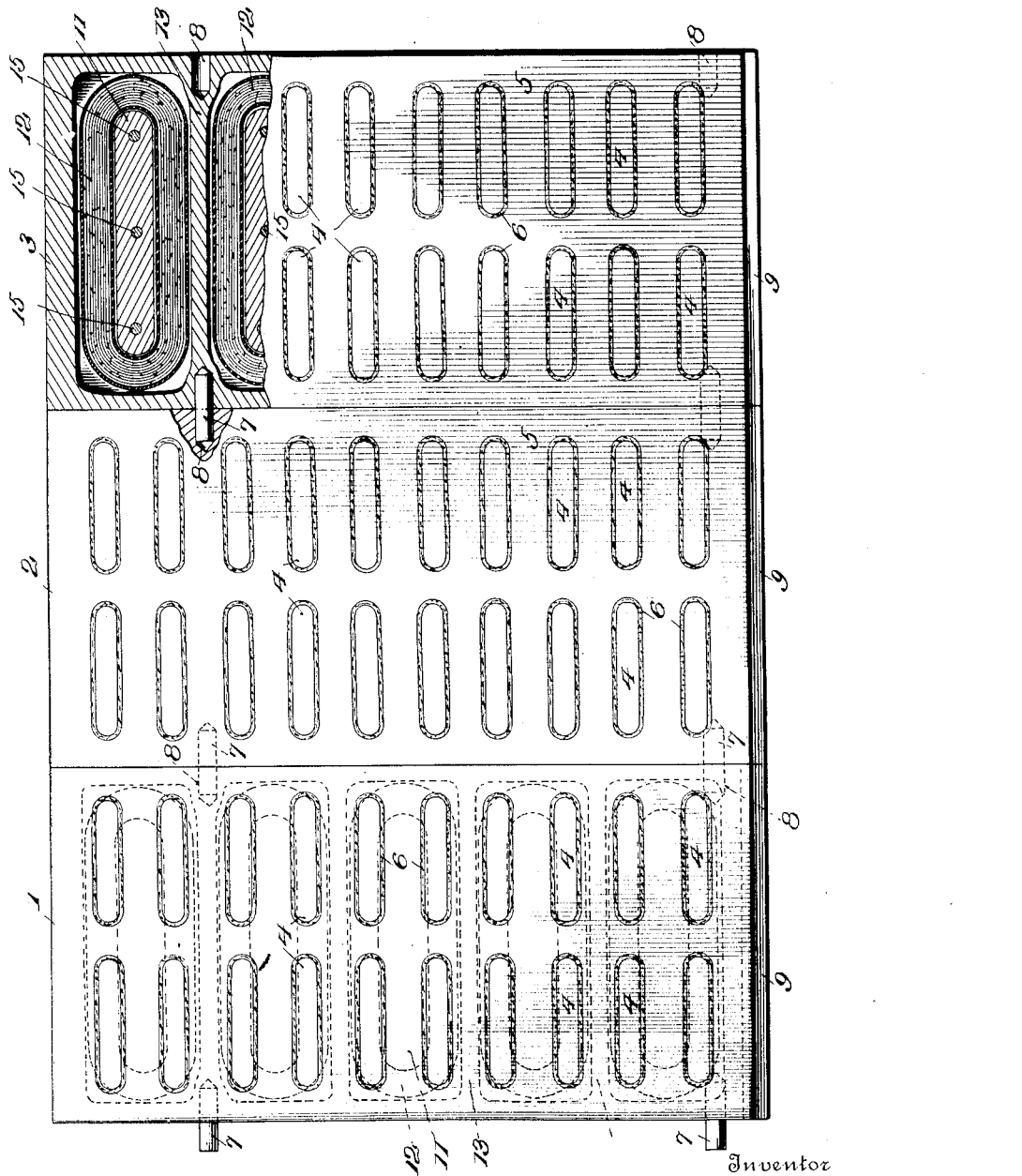

UNITED STATES PATENT OFFICE.

LOUIS W. DOWNES, OF PROVIDENCE, RHODE ISLAND.

MULTIPLE-UNIT CHUCK.

1,036,977.  Specification of Letters Patent.  Patented Aug. 27, 1912.

Application filed July 31, 1911. Serial No. 641,507.

*To all whom it may concern:*

Be it known that I, LOUIS W. DOWNES, of Providence, Rhode Island, have invented new and useful Improvements in Multiple-Unit Chucks, which invention is fully set forth in the following specification.

This invention relates to improvements in magnetic chucks for holding magnetic material while undergoing machining operations such as grinding, and has for its object to provide a multiple unit chuck adapted for holding comparatively large pieces of work and which may be built up to any suitable dimension for the particular work required by assembling and coupling together single units of convenient size, weight and shape for handling.

Certain kinds of machining operations heretofore performed on large pieces of work by planers and milling machines are in many cases being done by grinders, the work held by a single large magnetic chuck. The construction of magnetic chucks suitable for such heavier classes of work, necessitates increasing the weight of the chuck beyond that which can be readily handled without the use of special appliances for hoisting or lifting into position and furthermore the initial cost of such a chuck is excessive.

To overcome the above objections, I have designed for construction what I term a multiple unit chuck which is characterized by being capable of being assembled from individual unit magnetic chucks which are adapted to be readily coupled together and combined into one chuck of any size commensurate with the work to be held. Each of the units is preferably a complete magnetic chuck in itself and is provided in addition to the usual means of clamping to a bed with other means whereby it may be combined for operation in connection with other units or sections to constitute a unitary magnetic chuck structure of larger dimensions which ordinarily would be too heavy and cumbersome to be lifted by a workman without the use of hoisting appliances. The units are adapted to be assembled for either vertical or horizontal grinding, and are adapted to be alined and rigidly coupled to each other and to be uncoupled very quickly and expeditiously.

Another feature of my improvement and one which I consider of importance resides in providing the individual magnetic chuck with a switch having a water-tight housing, the switch handle and cables passing through the walls of the housing making therewith water-tight joints. The advantages of this will be apparent when it is understood that work which is subject to grinding operations frequently requires flooding with water to reduce temperature. Such water finds its way to and through the ordinary switch casing resulting in injury to the insulating covering and possible grounding and burning out of the circuits.

While any form of pole faces and air gaps may be used in the construction of the unitary magnetic elements of my chuck, I prefer and do use the form shown in the application of Ralph C. Patton, Serial No. 636,635, filed June 27th, 1911. So much only of the construction shown in the above application will be here shown and described as will be necessary to a proper understanding of the present invention.

I have shown, by way of example, one form of my invention in the accompanying drawings which are designed merely for the purpose of illustration and not as limiting the invention, reference being had to the claims for this purpose.

In the drawings:—Figure 1 is a view in elevation and broken section, showing the face of my multiple unit chuck built of the sections or units. Fig. 2 is a perspective view as seen from the rear of a single unit. Fig. 3 is a side elevational view of one of the units with parts broken away to show details of construction and to reduce the size of the figure. Fig. 4 is in part a horizontal sectional view on the line 4—4 of Fig. 3, and in part a plan view of the same. Fig. 5 is a rear elevational view showing the manner of extending the sections in two directions.

Referring to Fig. 1, I have shown therein a multiple unit chuck made up of three oblong rectangular faced units or sections 1, 2, 3, each presenting a plurality of oblong pole extensions 4 of one polarity with their faces flush with the face plates 5 which are of opposite polarity and magnetically insulated therefrom by air gaps filled with Babbitt metal or like material 6. The several units are alined before bolting together by means of dowel pins 7 entering sockets 8 and also by means of a key 9 which is adapted to enter a groove in the bed plate 10 of the grinding machine, not shown. In the example given, the units stand on edge with their longer dimension vertical, presenting a polar surface for holding work on a vertical grinder. The preferred means for fastening the units together I have shown in detail in Figs. 2, 3 and 4. Since each unit chuck is the same in construction, the description of one will serve for the others. The side walls of the unit or section which may or may not be integral with the face wall are accurately trued to a rectangular shape and form a space for reception of the forked cores 11 which in the present instance are T-shaped but have four pole extensions, the shank of the T being adapted to receive an energizing coil 12. The number of the cores for each unit may vary according to the size of the unit. Five such cores have been indicated for each section though any other number may be used. Each core is separated from its companion by a transverse partition 13 which is preferably a projecting part of the face wall. The rear of this casing is preferably closed by a plate 14 which is made fast thereto and to the magnet cores by means of screws 15. This plate serves not only as a closure for the chuck casing but also as a support for the coupling means for securing the units together and to the base or bed of the machine on which the chuck is to be supported. To this end and for the purpose of securing rigidity and also economy of construction, a plurality of extension or bracket plates 16, 17 are provided. Three have been shown though four may be used. These extensions may be separate pieces or may be integral and supported by plate 14 or by the frame of the chuck, but I prefer to construct and support them as illustrated in Fig 2. Holes 18 are provided in plate 17 for receiving clamping bolts. The brackets 16, 16 are also provided with openings 19, 19, through which bolts may pass for building on other units to either or both brackets. To facilitate the forming of such additional units alining studs 7 are also provided. These studs are preferably separable from the brackets and are slipped into their sockets as occasion demands. A key 9 is also provided which engages a recess in the casing and a corresponding recess in the bed plate, thus further assisting in alining the units when assembling them.

By reason of the construction thus far described, the unit chucks may be combined into a single chuck having a vertical working face extending horizontally in either direction and of a height that of a single unit by bolting together the brackets in the manner indicated. If a working face is desired having a height greater than that of a single unit, the side of the bracket 16 may be bolted to the bed plate and then other sections may be bolted to the plate 17 and the companion bracket 16 so as to extend the working face both horizontally and vertically.

In order to combine the units into a chuck having a single horizontal face of any desired extent, I provide the brackets 16, 16 with finished surfaces 20, 21, parallel with the face of the chuck, but at different distances therefrom in order that a parallel block 22 may be used, thereby permitting access to the rear of the chuck for the insertion of straps through openings 19 to secure the units to the machine and also effecting the coupling of the brackets. Current is supplied to the energizing coils of each unit through a switch 23 mounted on the plate 14 between the brackets, which latter serve also for its protection. This switch as indicated above is characterized by having water-tight joints where the cable enters and where the switch handle appears as well as where the switch casing joins the wall 14. This water-proof construction is of peculiar importance in connection with a magnetic chuck because the heat developed in the operation of grinding the work held by the chuck and that developed in the coils by passage of the electric current requires the use of water to flood the work and keep the temperature down. With a switch as heretofore constructed, water is extremely likely to enter the switch and cause a grounded circuit with disastrous results to the switch and windings of the chuck. With a switch rendered water-proof, such accidents cannot occur. This switch is further characterized by performing other functions, to wit, on one position of the handle the current is turned off and this is indicated on the switch by off-position; in the next turn of the handle the current is momentarily reversed, thereby causing demagnetization of the polar surfaces. This position is marked De-Mag. The third position of the handle cuts off the current and the work is then readily removed from the holding face.

The wiring scheme is the usual series arrangement through all the coils and the switches.

It will be apparent that the working face of the multiple unit chuck may be extended both vertically and horizontally by using the construction having four extensions or brackets instead of three extensions, as shown in Fig. 2.

What is claimed is:

1. A magnetic chuck unit for assembling with other chuck units into a multiple unit chuck comprising a work-holding face, a rear face and members extending rearwardly from the latter face for holding the chuck in operative position in relation to a bed plate and to other like chuck units.

2. A magnetic chuck unit for assembling with other like units into a multiple unit chuck comprising a magnetic chuck frame, and means for securing one side of the same to a base and another side to the side of a second unit chuck.

3. A magnetic chuck unit for assembling with other units into a multiple unit chuck comprising a frame, bracket members extending to the rear of the same adapted to support said frame vertically on one of its edges and to secure another edge to the edge of a second unit.

4. A magnetic chuck unit for assembling with other units into a multiple unit chuck, comprising a magnetic chuck frame, brackets extending to the rear of the same, two of which have finished supporting edges and openings for receiving means adapted to secure the chuck in a horizontal position or in vertical position and to other units on one or more sides of said frame.

5. A magnetic chuck unit for assembling with other units into a multiple unit chuck, comprising a rectangular magnetic chuck frame to which is secured a plate closing the rear end of the frame, said plate being provided with three bracket plates normal to the face of the chuck and located along three edges of said plate closure, said bracket plates having openings for receiving means adapted to fasten said frame in a vertical position or a horizontal position and to other units on one or more sides of said frame.

In testimony whereof I have signed this specification in the presence of two subscribing witnesses.

LOUIS W. DOWNES.

Witnesses:
GEORGE W. STEERE,
K. E. GREENE.